United States Patent [19]

Mahoney et al.

[11] Patent Number: 4,594,176
[45] Date of Patent: Jun. 10, 1986

[54] POLYALKYLENE POLYAMINE-GLYCOL ACCELERATORS FOR PAINT REMOVAL COMPOSITIONS

[75] Inventors: Dennis F. Mahoney, Hastings; William V. Block, Apple Valley, both of Minn.

[73] Assignee: Economics Laboratory, Inc., St. Paul, Minn.

[21] Appl. No.: 744,398

[22] Filed: Jun. 13, 1985

Related U.S. Application Data

[63] Continuation of Ser. No. 603,679, Apr. 25, 1984, Pat. No. 4,537,705.

[51] Int. Cl.<sup>4</sup> .............................. C11D 7/14; C11D 7/52
[52] U.S. Cl. ................................. 252/153; 252/156; 252/158; 252/525; 252/529; 252/544; 252/548
[58] Field of Search ............... 252/156, 158, 153, 529, 252/544, 548, 525; 134/38

[56] References Cited

U.S. PATENT DOCUMENTS

| | | | |
|---|---|---|---|
| 2,975,140 | 3/1961 | Yaroch | 252/110 |
| 2,992,946 | 7/1961 | Arden et al. | 134/29 |
| 2,992,995 | 7/1961 | Arden et al. | 252/156 |
| 3,021,232 | 2/1962 | Pretka | 427/385 |
| 3,053,897 | 9/1962 | Clark et al. | 134/38 |
| 3,095,380 | 6/1963 | Arden | 252/158 |
| 3,538,007 | 11/1970 | Cooper et al. | 252/144 |
| 3,615,825 | 10/1971 | Gansser | 134/38 |
| 3,615,827 | 10/1971 | Murphy | 134/38 |
| 3,654,370 | 4/1972 | Yeakey | 260/584 B |
| 3,671,447 | 6/1972 | Murphy | 252/156 |
| 3,671,465 | 6/1972 | Murphy | 252/548 |
| 3,890,254 | 6/1975 | Guthrie | 264/25 D |
| 3,954,648 | 5/1976 | Belcak et al. | 252/158 |
| 3,972,839 | 8/1976 | Murphy | 252/548 |
| 3,990,986 | 11/1976 | Gabel et al. | 252/315 |
| 4,366,002 | 12/1982 | Carandang | 134/2 |

FOREIGN PATENT DOCUMENTS

| | | |
|---|---|---|
| 538842 | 3/1957 | Canada . |
| 792267 | 8/1968 | Canada . |
| 22441 | 2/1979 | Japan . |
| 1054266 | 1/1967 | United Kingdom . |
| 1056590 | 1/1967 | United Kingdom . |

OTHER PUBLICATIONS

"Jeffamine Polyoxypropyleneamines" (1978, Texaco Chem. Co.), pp. 1–4, 59–69.
"Jeffamine Poly(oxyethylene)diamines/Jeffamine ED Compounds", 1981, Texaco Chemical Co.
Compendium of Organic Synthetic Methods", I. T. Harrison et al., Eds., Wiley-Interscience (1971), pp. 232, 250–255.

*Primary Examiner*—Prince E. Willis
*Attorney, Agent, or Firm*—Merchant, Gould, Smith, Edell, Welter & Schmidt

[57] ABSTRACT

Alkaline compositions useful to form aqueous paint stripping solutions are disclosed which comprise mixtures of an alkali metal hydroxide, a polyoxyalkylene polyamine accelerator and, optionally, a glycol or glycol ether accelerator.

8 Claims, No Drawings

POLYALKYLENE POLYAMINE-GLYCOL ACCELERATORS FOR PAINT REMOVAL COMPOSITIONS

This is a continuation, of application Ser. No. 603,679, filed Apr. 25, 1984, now U.S. Pat. No. 4,537,705.

FIELD OF THE INVENTION

The present invention relates to compositions for removing paint films from painted surfaces. More particularly, the invention relates to aqueous alkaline systems containing polyoxyalkylene polyamines and other components that remove both new and aged paint films effectively, safely and with high energy efficiency.

BACKGROUND OF THE INVENTION

The finishing of a wide variety of articles of manufacture is often accomplished by the application, i.e. by spraying, dipping or brushing, of one or more coatings of paint. The term "paint" as used herein is intended to refer to any of the wide variety of colored or clear protective, sealant or decorative compositions based on natural or synthetic film-forming compositions. Paints commonly used for metallic surfaces include enamels, lacquers and latexes based on phenolic, polyester, alkyd, acrylic, polyurethane and polyepoxide resins.

Paint removal in finishing operations is important for two reasons. First, the periodic treatment of support devices such as paint hooks, jigs and hangers, as well as paint booth components to remove accumulated paint residue is necessary for their continuous day-to-day use. Secondly, efficient paint removal is necessary to avoid the need to scrap defectively-painted parts and to increase the ease of recycling scrapped painted metal articles.

Aqueous alkaline paint strippers commonly employed to remove paint from metal surfaces can be aqueous solutions of a wide variety of organic and inorganic compounds. The alkalinity is primarily provided by an alkali metal hydroxide. Other ingredients include buffers, corrosion inhibitors, surfactants, detergents and chelating agents. Typically, paint strippers include active ingredients at a total concentration of about 5–50% weight of the total composition, e.g. one-half to several pounds per gallon, and are used at about 50°–115° C. The painted articles to be stripped are exposed to these stripping solutions by a dipping, spraying or other coating procedure, and following an adequate exposure period, the loosened paint film and adhered stripper are typically removed by a water rinse.

Alkali metal salt-based paint removers often employ water-miscible organic additives or accelerators to enhance the ability of the stripping composition both to penetrate the paint film and to dissolve or suspend the loosened paint. Common stripping bath accelerators include phenolic compounds such as cresylic acid and primary, secondary or tertiary monoamines of the general formula $R_1R_2R_3N$ wherein 1–3 of $R_1$, $R_2$ and $R_3$ are (lower)alkanol; hydroxy-, aryloxy- or alkoxy-substituted ethers; lower(alkyl) or aryl. These amines may also be used in combination with alkylene glycols or glycol ethers. For example, U.S. Pat. Nos. 3,615,825 and 3,972,839 disclose paintstripping compositions prepared by combining low molecular weight hydroxyalkyl- or alkoxyalkyl amines with alkaline solutions, while U.S. Pat. Nos. 3,671,465 and 3,663,447 disclose alkaline stripping compositions incorporating mixtures of tripropylene glycol or an alkylene glycol monophenyl ether with hydroxyalkyl- or alkoxyalkyl-monoamines.

However, a continuing demand for improved accelerators exists due to the suspected carcinogenicity of phenolics and the tendency of many of the lower molecular weight alkanolamines, alkoxylated primary amines and aromatic amines to thermally decompose and volatilize during the stripping process, producing noxious ammonialike vapors and reducing the useful like of the stripping bath.

Clearly, a substantial need exists for paint stripping baths comprising accelerators which are effective when used alone or in combination with known accelerators, which are relatively nonvolatile, and which are stable when combined with aqueous alkaline solutions.

BRIEF DESCRIPTION OF THE INVENTION

We have formulated highly-effective, thermallystable, alkaline paint remover compositions which comprise, as accelerators, one or more polyoxyalkylene polyamines. The amine accelerators are selected from those classes of polyoxyalkylene polyamines which substantially increase the rate of paint removal over that presently attainable using alkali metal hydroxide-based paint removers. The thermal stability, high molecular weights and low vapor pressure of the polyoxyalkylene polyamines contribute substantially to the energy efficiency and safety of the present paint removers.

Optionally, the alkaline paint stripping compositions incorporate a glycol compound that cooperates with the polyamine accelerators to further substantially shorten paint removal times.

When employed in alkali metal hydroxide-based stripping baths, the glycol-polyamine accelerator mixtures are superior in performance to the commonly-employed alkanolamines and phenolics.

These new alkaline paint removers may comprise active ingredients in aqueous solution at a concentration suitable for end-use as paint stripping baths, or may be formulated as concentrated solutions or slurries which are diluted with additional water prior to use.

Preferably, the polyoxyalkylene polyamines and the optional glycol accelerators will be incorporated into solid compositions comprising alkali metal hydroxides, builder salts, chelating agents and the like. These solid concentrates are dissolved in water to prepare stripping baths comprising the desired concentration of active ingredients.

As used herein, the term "concentrate" is intended to refer to any of the present compositions to which water is added prior to its use as a paint remover.

DETAILED DESCRIPTION OF THE INVENTION

Polyamines

The paint removal compositions of the invention comprise an alkali metal hydroxide, preferably sodium or potassium hydroxide, as the principal source of alkalinity, and a minor but effective amount of a polyoxyalkylene polyamine accelerator compound of the formula $(R_1)(R_2)NXN(R_1)(R_2)$, wherein $R_1$ and $R_2$ are selected from the group consisting of hydrogen, (lower)alkyl and $[CH_2CH(Y)O]_mH$, wherein Y is hydrogen or (lower)alkyl and m is about 1–4; and X is selected from the group consisting of $C_2$–$C_6$ alkylene, polyoxy(lower)alkylene and mixtures thereof. When X is a polyoxy(- lower)alkylene moiety, X can also include 1-3 $C_2$-$C_6$ alkylene units each substituted with about 1-3 units of a $[OCH_2CH(Y)]_nN(R_1)(R_2)$ group wherein Y is hydrogen or (lower)alkyl, n is about 1-4, and $R_1$ and $R_2$ are preferably hydrogen. As used herein, the term "lower", as applied to an alkyl, alkylene, or alkanol substituent is intended to indicate a branched or straight-chain $C_1$-$C_4$ moiety.

A preferred class of polyoxyalkylene polyamine accelerator compounds are the aliphatic primary diamines derived from propylene oxide-capped polyethylene glycols of general structural formula I:

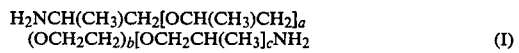
$$H_2NCH(CH_3)CH_2[OCH(CH_3)CH_2]_a(OCH_2CH_2)_b[OCH_2CH(CH_3]_cNH_2 \quad (I)$$

wherein a+c is about 3-4 and b is about 10-50. These diamines exhibit an average molecular weight (M.W.) within the range of about 500-2000 and are available from Texaco as the Jeffamine ® ED series, e.g. ED600, ED900 and the like, wherein the numeral refers to the average molecular weight of the molecule.

Polyoxypropylene diamines of formula I wherein b is 0 and a+c is about 2-35 (average molecular weight about 200-2000) are also useful in the practice of the present invention and are commercially available from Texaco as the Jeffamine ® D series, e.g. D-230, D-400, D-2000 and the like, wherein the numeral refers to the average molecular weight.

Another preferred class of polyoxyalkylene polyamine accelerator compounds are derived from $C_3C_6$ polyols wherein the polyolhydroxyl groups are substituted with amino(lower)alkylenoxy moieties to provide compounds of the general formula II:

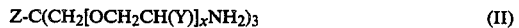
$$Z-C(CH_2[OCH_2CH(Y)]_xNH_2)_3 \quad (II)$$

wherein Z is hydrogen, methyl or ethyl; Y is hydrogen or (lower)alkyl; and x is about 2-4. A mixture of compounds of formula II, wherein Y is methyl, and Z is ethyl (M.W. about 400) is available from Texaco as Jeffamine ® T-403.

Another preferred class of polyamine accelerator compounds is the substituted tetrakishydroxy(lower)alkoxyalkylene diamines of general formula III:

$$(R_1)(R_2)N(CH_2)_yN(R_1)(R_2) \quad (III)$$

wherein y is 2-6, preferably 2; and $R_1$ and $R_2$ are $[CH_2CH(Y)O]_m$ H wherein m is about 1-4, preferably about 1-2 and Y is hydrogen or (lower)alkyl, preferably hydrogen or methyl. Especially effective members of this class include N, N, N', N'-tetrakis(2-hydroxyethyl)ethylene diamine and N, N, N', N'-tetrakis(2-hydroxypropyl)ethylene diamine (Quadrol ®, BASF Wyandotte). The molecular weight of preferred members of this class of diamine is within the range of about 200-1000.

Glycols

The paint remover compositions of the invention can also include an effective amount of a glycol accelerator selected from the group consisting of a (lower)alkylene glycol, a (lower)alkylene glycol (lower)alkylether and a (lower)alkylene glycol phenyl-ether. These may be selected from any of the commonly-used glycol or glycol ether accelerators, such as propylene glycol, tripropylene glycol, dipropylene glycol, their (lower)alkyl- or phenylethers or mixtures thereof. Of the mono(- lower)alkyl ethers, methyl is preferred. Of the monomethyl ether additives, tripropylene glycol monomethyl ether (TPM) is preferred, due to its low toxicity. Preferably the ratio of alkylene glycol or alkylene glycol ether to polyamine will be about 3-1:1, most preferably about 2:1. Surprisingly, it has been found that mixtures of polyoxyalkylene polyamine and (lower)alkylene glycol ether accelerators exhibit an accelerating power when used in alkaline stripping baths which is substantially greater than the simple additive effect which would be anticipated.

Builders and Anti-Corrosion Agents

The paint remover compositions may also contain one or more builders which function to enhance the detergency of the stripping bath. Suitable inorganic builders include alkali metal salts, examples of which are tetrasodium pyrophosphate, sodium carbonate, sodium bicarbonate, sodium borate and the like. An effective amount of an alkali metal silicate such as sodium metasilicate or sodium orthosilicate may be employed as corrosion inhibitor.

Chelating Agents

The paint remover compositions may also contain a chelating or sequestering agent which functions to inhibit the precipitation of the calcium and magnesium ions which enter the bath during the stripping process. Suitable chelating agents include the alkali metal salts of organic acids such as sodium gluconate, sodium citrate, EDTA and the like.

Minor but effective amount of surfactants are also commonly employed in alkaline stripping concentrates to aid in breaking the paint film and in dispersing the loosened paint in the bath. Although the polyamine accelerators of the present invention also function effectively as surfactants, about 0.25-5% of a suitable base-stable nonionic or anionic surfactant may also be employed in the present compositions. Of the classes of these optional surfactants, the anionic surfactants are preferred and may include the sodium, potassium or ammonium salts of higher alkyl mono or polynuclear aryl sulfonates having from about 1 to 16 carbon atoms in the alkyl group (e.g., sodium dodecylbenzenesulfonate, magnesium tridecylbenzenesulfonate, lithium or potassium pentapropylenebenzenesulfonate); alkali metal salts of alkyl naphthalene sulfonic acids (methyl naphthalene sodium sulfonate, Petro ® AA, Petrochemical Corporation); the fatty acid amides of amino alkyl sulfonic acids, e.g., the lauric acid amide of taurine; as well as numerous other anionic organic surface active agents such as sodium xylene sulfonate, sodium naphthalene sulfonate, sodium toluene sulfonate; and mixtures thereof.

The alkaline paint stripping concentrates formulated according to the present invention will comprise a major proportion of an alkali metal hydroxide, preferably about 20-99%, most preferably about 45-85% of sodium or potassium hydroxide; about 5-30%, preferably about 15-25% of an inorganic builder salt; about 3-30%, preferably about 15-25% of a chelating agent, about 1-10%, preferably about 2-8% of a corrosion inhibitor, about 0.2-20%, preferably about 0.5-10% of a polyoxyalkylene polyamine accelerator and optionally, about 0.5-40%, preferably about 1-20% of a glycol accelerator.

The solid concentrates are prepared by dry-blending the salts in the approximate order given above, and subsequently mixing in the accelerators with further blending until a homogenous, free-flowing granular concentrate is obtained. The resultant granular concentrate is then added to water to yield a stripping bath solution, the concentration of which may vary over a wide range, depending upon the type of paint sought to be removed, the bath temperature and the exposure time. Alternatively, the alkali metal hydroxide may be dissolved in water to the desired bath concentration and the other components added, with agitation or heating, if necessary, until a homogeneous solution is obtained. Preformed alkaline stripping baths may be accelerated by the addition of an effective amount of the polyoxyalkylene amine accelerator or an amine-glycol combination.

Preferred aqueous stripping baths prepared according to the present invention will therefore comprise about 2–40%, preferably about 3–30% by weight sodium or potassium hydroxide, about 1–15% builder salt, about 1–8% chelating agent, about 1–2% silicate, about 0.2–10%, preferably about 0.5–5% of a polyoxyalkylene polyamine accelerator, and optionally, about 0.5–20%, preferably about 1–10% of the glycol accelerator, i.e. di- or tripropylene glycol monomethyl ether.

Painted articles to be stripped will be exposed to the present stripping solutions by immersion therein, or the solutions may be brushed or sprayed onto the painted surface or otherwise maintained in contact therewith for a period of time sufficient to substantially loosen the paint film. The adhered stripper and loosened paint is then removed, preferably by a water rinse, and the operation may be repeated as often as necessary to completely remove the paint film.

Of these application methods, immersion in a bath is preferred, and the painted article may be positioned under the surface of the bath in a static manner or continuously conveyed through a trough of the bath.

Although the present solutions are effective paint removers at ambient temperatures, it is preferred to contact them with paint films in heated baths at temperatures of about 50°–110° C., preferably about 80°–105° C. Likewise, bath agitation, e.g. stirring or shaking will be employed, when necessary, especially when stripping resistant finishes, such as baked polyesters and epoxides.

The invention will be further described by reference to the following detailed examples.

EXAMPLE 1—Paint Remover Bath

Sodium hydroxide (119 g) was slowly dissolved in 1.0 gallons (3760 ml) water with stirring, followed by the sequential addition of 43.5 g sodium carbonate, 43.5 g sodium gluconate, 11.0 g sodium metasilicate and 2.2 g sodium napthalene sulfonate. Jeffamine® D-230 (4.4 g) was stirred into this solution to provide an alkaline solution comprising accelerator in an amount equal to 2% of the total weight of the active ingredients (hereinafter "2% Bath"). This solution was suitable for use as a paint remover bath.

EXAMPLE 1A—Paint Remover Concentrate

A solid concentration is prepared according to the procedure of Example 1 by blending the sodium salts in a ribbon blender, adding the D-230 and blending until the mixture was homogeneous. The granular composition is then dissolved in water to the desired concentration for use as a stripping bath.

EXAMPLE 2—Paint Remover Bath

Following the procedure of Ex. 1, 118 g sodium hydroxide, 43.0 g sodium gluconate, 11.0 g sodium metasilicate, 2.0 g sodium napthalene sulfonate and 6.7 g Jeffamine® D-230 were dissolved in 1.0 gallon of water to provide a stripping bath in which the accelerator comprises 3% of the total active ingredients (hereinafter "3% Bath").

EXAMPLE 3—Paint Remover Bath

A stripping bath was prepared according to the procedure of Example 1, but substituting 4.4 g Quadrol® for the d-230 accelerator.

EXAMPLE 4—Paint Remover Bath

A stripping bath was prepared according to the procedure of Example 2, but substituting 6.7 g Jeffamine® ED-600 for the D-230 accelerator.

EXAMPLES 5–10—Glycol/Amine Baths

Table I, below, summarizes the compositions of 3% paint removal baths prepared according to the procedure of Example 2, but adding a mixture of accelerators to the preformed alkaline bath.

TABLE I

| ACCELERATED ALKALINE BATHS | |
|---|---|
| Example | Accelerator |
| 5 | 2% Tripropylene glycol monomethyl ether (TPM) + 1% D-230 |
| 6 | 2% TPM + 1% D-400 |
| 7 | 2% TPM + 1% ED-600 |
| 8 | 2% TPM + 1% ED-230 |
| 9 | 2% TPM + 1% T-403 |
| 10 | 2% TPM + 2% Quadrol® |

EXAMPLE 11—Phenolic Bath

Sodium hydroxide (61.6 g), sodium carbonate (158 g) and sodium gluconate (35.3 g) were combined and mixed in a ribbon blender. A mixture of para-phenylphenol (70 g), TPM (17.0 g) and Jeffamine® ED-600 (91 g) was added, and stirring continued until a homogeneous granular blend was obtained. This concentrate dissolved in 1 gallon of water was employed as a paint remover bath.

EXAMPLE 12—Phenolic Bath

The concentrate of Example 11 was prepared, substituting 91 g of Jeffamine® D-230 for the ED-600. Eight ounces of this concentrate (224 g) was dissolved in 1.0 gallon of water and employed as a paint remover bath.

EXAMPLE 13—Phenolic Bath

A stirred solution of 243.0 of sodium hydroxide and 8.7 g of sodium gluconate in 480 ml of water was treated with a mixture of 175 g cresylic acid, 19 of TPM and 10 g of Jeffamine® D-230. The resulting concentrate was diluted with 7.7 liters of water and employed as a paint remover bath.

Control Composition

A one gallon aqueous solution of 224 g (8 oz.) of a solid alkali stripping concentrate consisting of a mixture of 124.7 g sodium hydroxide, 45.3 g of sodium carbonate, 45.3 g of sodium gluconate, 11.3 g of sodium metasilicate, and 2.3 g of sodium napthalene sulfonate was prepared and employed as a control stripping bath solution against which to compare the performance of the polyamine accelerators of the present invention.

PAINT STRIPPING EXPERIMENTS

General Procedure

Steel panels (3 in. ×5 in.) were coated to the indicated film thicknesses with a variety of paints and immersed in containers holding 1.0 liter of paint remover bath. At regular intervals, test panels were removed from the baths and, if the paint film had not been completely loosened, were rinsed with water. The stripping times recorded indicated the total exposure times required to completely remove the paint film, unless otherwise indicated.

EXAMPLE 14—Polyamine Accelerators

Table II summarizes the stripping times required for paint-coated steel plates employing the indicated paint remover baths which were maintained at 82° C. during the stripping process.

TABLE II

| Paint Type (Thickness/Mils) | STRIPPING TIMES (Minutes) | | | | |
|---|---|---|---|---|---|
| | Ex. 1 Bath | Ex. 2 Bath | Ex. 3 Bath | Ex. 4 Bath | Control |
| Low Baked Enamel (1.5–1.9) | 10 | 15 | 10 | 17 | 21 |
| Acrylic Baked (1.5–1.9) | 13 | 7 | 17 | 9 | 18 |
| Acrylic Latex (1.5–2.0) | — | 3 | — | 4 | 4 |
| Alkyd/amine Baked (1.5–1.8) | — | 14 | — | 15 | 12 |
| High Solids Polyester (1.7–1.2) | — | 29 | — | 29 | 45 |
| Epoxy Lacquer Baked (0.4–0.6) | 30 (slight effect) | — | — | — | 30 (slight effect) |

From the results summarized in Table II, it is apparent that the introduction of small amounts of polyoxyalkylene polyamines into aqueous alkaline stripping baths results in substantial decreases, i.e. about 5–60%, in the times required to strip a variety of paint types.

EXAMPLE 15—Polyamines With TPM

Steel plates coated with ten paint types were exposed at 82° C. to the control bath and to baths formed by treating the control solution with the indicated accelerator mixtures until the paint was completely removed by a water rinse. The results are summarized in Tables III, IV and V below.

TABLE III

| Paint Type (Thickness/ Mils) | STRIPPING TIMES Various Polyamines with TPM | | | |
|---|---|---|---|---|
| | Control | Ex. 5 Bath (2% TPM- 1% D-230) | Ex. 6 Bath (2% TPM- 1% D-400) | Ex. 7 Bath (2% TPM- 1% ED-600) |
| Vinyl Phenolic (0.8–1.0) | 1 minute | 10 seconds | 10–15 seconds | 20 seconds |
| Phenolic Polyester (1.0–1.4) | 1.25 minute | 45–50 seconds | 50–60 seconds | 45–50 seconds |
| Alkyd (1.0–1.4) | 1 minute | 1 minute | 50 seconds | 1 minute |
| Acrylic Latex (1.5–2.0) | 4 minutes | 2.5 minutes | 3 minutes | 2.5 minutes |
| Alkyd/amine Baked (1.5–1.8) | 12 minutes | 3.5 minutes | 4.5 minutes | 5.5 minutes |

TABLE IV

| Paint Type (Thickness/Mils) | STRIPPING TIMES (minutes) | | |
|---|---|---|---|
| | Control | Ex. 6 Bath (2% TPM- 1% D-400) | Ex. 10 Bath (2% TPM- 2% Quadrol ®) |
| Low Baked Alkyd Enamel (1.5–1.9) | 20 | 7.5 | 9 |
| Acrylic Baked (1.5–1.9) | 15 | 7 | 8 |
| High Solids Polyester Baked (1.7–2.1) | 45 | 13 | — |
| 2-Component Polyurethane (1.8–2.3) | 50 (slight effect) | 2.5 | — |
| Clear Epoxy Baked (0.4–0.6) | 30 (very slight effect) | 4 | 12 |

TABLE V

| Paint Type (Thickness/Mils) | STRIPPING TIMES (Minutes) | |
|---|---|---|
| | Control | Ex. 9 Bath (2% TPM- 1% T-403) |
| Vinyl-Phenolic (0.8–1.0) | 1.0 | 0.25 |
| Modified Phenolic (1.0–1.4) | 1.0 | 0.83 |
| Alkyd (1.0–1.4) | 1.25 | 0.83 |
| Acrylic Latex (1.5–2.0) | 4.0 | 2.75 |
| Alkyd/Amine Baked (1.5–1.8) | 12.0 | 5.50 |
| 2-Component Polyurethane (1.8–2.3) | 50 (slight effect) | 4.0 |
| Epoxy Lacquer Baked (0.4–0.6) | 30 (slight effect) | 4.0 |

From the results summarized on Tables III–V, it is apparent that a combination of TPM and a polyoxyalkylene diamine of formula I above is effective to accelerate the rate of removal of a variety of paint films over that attained by a non-accelerated caustic stripper by factors varying from about 1.20–20 or more.

EXAMPLE 16—Energy Efficiency

The data summarized below in Table VI indicates that the stripping acceleration achieved by adding 2% TPM and 1% Jeffamine ® ED-600 to a control solution of 24% aqueous sodium hydroxide is significant over the range of temperatures commonly employed when stripping paint with alkaline baths. Therefore, the use of polyalkylene glycols or glycol ethers and polyamine accelerators allows the use of lower alkaline stripping bath temperatures while achieving stripping rates equal to those attained by unaccelerated baths operated at higher temperatures, resulting in significant energy savings.

TABLE VI

| Paint Type (Thickness/Mils) | STRIPPING TIME (Minutes) | | | | | | | |
|---|---|---|---|---|---|---|---|---|
| | 71° C. | | 82° C. | | 93° C. | | 105° C. | |
| | Control | A* | Control | A | Control | A | Control | A |
| Vinyl (Phenolic) (0.8–1.0) | 17 | 10 | 14 | 6 | 9 | 5 | 4 | 3 |
| Phenolic Polyester (1.0–1.4) | 8 | 5 | 7 | 3 | 5 | 2 | 2 | 1 |
| Alkyd Amine | 10 | 9 | 9 | 5 | 4 | 2 | 1 | 0.5 |

TABLE VI-continued

| Paint Type (Thickness/Mils) | STRIPPING TIME (Minutes) | | | | | | | |
|---|---|---|---|---|---|---|---|---|
| | 71° C. Control | A* | 82° C. Control | A | 93° C. Control | A | 105° C. Control | A |
| Baked (1.5–1.8) | | | | | | | | |

*A = Control + 2% TPM and 1% Jeffamine ® ED-600

EXAMPLE 17—Cooperative Effect

The experiments summarized on Table VII, below, indicate that while polyoxyalkylene polyamines and TPM are effective accelerators when added individually to an alkaline stripping solution, the accelerant effect of a mixture of the two additives is substantially greater than would be expected from simply using an equivalent percentage of either accelerant alone.

TABLE VII

ACCELERATOR COMPONENT EFFECTIVENESS
Stripping Times (Minutes)

| Paint Type (Thickness/Mils) | Control (8 oz/gal; 82° C.) | Ex. 5 Bath (2% TPM 1% D-230) | Control w/ 3% TPM | Ex. 2 Bath (3% D-230) |
|---|---|---|---|---|
| Low Baked Enamel (1.5–1.9) | 21 | 7 | 9 | 15 |
| Acrylic Baked (1.5–1.9) | 18 | 5 | 9 | 7 |
| Acrylic Latex (1.5–2.0) | 4 | 1 | 5 | 3 |
| Alkyd/amine Baked (1.5–1.8) | 12 | 2.5 | 4.5 | 14 |
| High Solids | 45 | 23 | 16 | 29 |

TABLE VII-continued

ACCELERATOR COMPONENT EFFECTIVENESS
Stripping Times (Minutes)

| Paint Type (Thickness/Mils) | Control (8 oz/gal; 82° C.) | Ex. 5 Bath (2% TPM 1% D-230) | Control w/ 3% TPM | Ex. 2 Bath (3% D-230) |
|---|---|---|---|---|
| Polyester (1.7–2.1) | | | | |

EXAMPLE 18—Comparative Tests

A number of alkaline paint strippers accelerated with alkanolamines, primary alkyd amines (ethanol and propanol amines), are commercially-available. Tables VIII and IX compare stripping times required for various coatings using the control stripper plus Jeffamines ® D-230, ED-600, or Quadrol ® with TPM with times required to strip using three alkanol amine-accelerants, also used with TPM.

TABLE VIII

STRIPPING TIMES*

| Paint Type (Thickness/Mils) | Ex. 7 Bath (1% 2% ED-600/TPM) | Ex. 5 Bath (1% 2% D-230/TPM) | 1% 2% TEA/TPM (1) | 1% 2% MEA/TPM (2) | 1% 2% DEA/TPM (3) |
|---|---|---|---|---|---|
| Low Baked Alkyd Enamel (1.0–1.4) | 7 min. | 7.25 min. | 11 min. | 11 min. | 8.5 min. |
| Acrylic Baked (1.5–1.9) | 6.5 min. | 6.5 min. | 10.5 min. | 10 min. | 8.5 min. |
| High Solids Polyester Baked (brown)(1.7–2.1) | 15.5 min. | 14 min. | 15 min. | 14 min. | 16 min. |
| Alkyd (air dried) (1.0–1.4) | 40 sec. | 45 sec. | 1 min. | 1 min. | 45 sec. |
| Epoxy Lacquer Baked (0.4–0.6) | 19 min. | 9 min. | — | 30 min. (partially) | 26 min. (partially) |

*Conditions: 226 g/gal of Control Stripper composition, 82° C.
(1) TEA — triethanolamine
(2) MEA — monoethanolamine
(3) DEA — diethanolamine The marked decrease in stripping time observed when the hydroxyalkylamines were replaced by polyalkylenoxy polyamines is even more significant than a simple time comparison would suggest since one percent by weight of ED-600 represents only one-third as many moles of accelerant as does an equivalent weight of TEA, while even the lower molecular weight D-230 represents about 80% of the moles of an equivalent weight of TEA.

TABLE IX

| Paint Type (Thickness/Mils) | Control | STRIPPING TIMES (Minutes) Ex. 10 Bath (2% Quadrol 2% TPM) | Control w/ 2% TEA + 2% TPM | Ex. 3 Bath (2% Quadrol ®) | Control w/ 2% TEA |
|---|---|---|---|---|---|
| Low Baked Enamel (1.5–1.9) | 20 | 9 | 11 | 10 | 11 |
| Acrylic Baked (1.5–1.9) | 20 | 8 | 11 | 17 | 24 |
| Epoxy Lacquer Baked (0.9–0.6) | 60 (slight effect) | 12 | 16 | 30 (slight effect) | 30 (slight effect) |

The data presented on Table IX indicate that, while a stripper mixture incorporating 2% of an alkylene diamine (Quadrol ®) is about equal in effectiveness to one using 2% TEA, an accelerator mixture of 2% of Quadrol ® and 2% TPM is superior to a mixture of 2% TEA and 2% TPM. The significance of this result is raised by the fact that the molecular weight of Quadrol ® is about twice that of TEA.

EXAMPLE 19—Acceleration of Phenolic Strippers

Surprisingly, polyamines were found to exert a enhanced accelerating effect when added to alkaline stripping baths employing phenolic-based accelerators. Baths using phenolic accelerating agents commonly employ conventional concentrations of alkali metal hydroxides which may be used in combination with one or more of the builders, chelators and/or anticorrosion agents described above. In use, these baths commonly employ about 0.1-20% of the phenolic accelerator, preferably about 1-10%. Table X, below, summarizes the results achieved by the addition of TPM and Jeffamine ® D-230 to two commonly-used phenolic paint strippers.

TABLE X

| | STRIPPING TIMES (minutes) | | | |
|---|---|---|---|---|
| Paint Type (Thickness/Mils) | Cresylic Acid (CA)* | Ex. 13 Bath | p-Phenyl phenol (PP)** | Ex. 12 Bath |
| Low Baked Enamel (1.5-1.9) | 25 | 18 | 7.5 | 6 |
| Acrylic Baked (1.5-1.9) | 28 | 11 | 8 | 6 |
| High Solids Polyester Baked (1.7-2.1) | 27 | 16 | 26 | 18 |
| Phenolic/polyester (1.0-1.4) | — | — | 7.5 | 5 |
| Alkyd/Amine Baked (1.5-1.8) | 5 | 4.5 | — | — |
| Epoxy Lacquer Baked (0.4-0.6) | — | — | 30 | 5 |
| Water Base Baked Enamel (1.9-2.2) | 10 | 7 | — | — |
| 2-Component Polyurethane (1.8-2.3) | 30 | 3 | — | — |
| Acrylic Latex (1.5-2.0) | 2 | 1.83 | 2 | 1.5 |

*The CA stripper used was a 1:16 mixture of a solution of 25% by weight sodium hydroxide, 9% sodium gluconate, 18% cresylic acid and 48% water with water.
**The PP stripper used was 6% aqueous solution of a mixture of 70% by weight sodium hydroxide, 18% sodium carbonate, 4% sodium gluconate and 8% para-phenyl phenol.

A 24% aqueous solution of the PP composition stripped 20-30 mils of water-based baked enamel from paint hooks in 10.25 hours at 82° C., while the Ex. 11 bath required only 6.66 hours to strip the hooks.

The significantly-shortened stripping times observed when polyamines were added to phenolic strippers will permit shortened total workplace exposure to phenolic vapors, with a concommitant reduction in potential toxic effects and environmental pollution.

Furthermore, the polyoxyalkylene polyamines useful in the practice of the present invention generally exhibit vapor pressures ranging from about 50-600 times less than the commonly-used amine accelerants such as monoethanol amine (0.48 mm Hg at 25° C.), isopropanolamine (0.51), methoxypropylamine (0.51) and ethoxyethyl(propyl)amine (40.0). Therefore, these polyamines are essentially nonvolatile at the commonly-employed bath temperatures and remain in the stripping bath, thus increasing the useful bath life over that obtainable with the monoamine accelerants further reducing the risk of workplace contamination.

The examples herein establish that a wide variety of polyoxyalkylene polyamines function effectively at low concentrations to accelerate the ability of both aqueous alkaline and phenolic-based stripping compositions to remove a wide variety of coating films over a wide range of operating temperatures. The accelerant ability of the present polyamines is further enhanced by the simultaneous use of polyalkylene glycols and glycol ethers and vice-versa. The present polaymines are both more effective than the commonly-used monoamine accelerators such as the ethanol amines and are more economical and safe to use due to their relatively high molecular weights and vapor pressures.

The invention has been described with reference to various specific and preferred embodiments and techniques. However, it should be understood that many variations and modifications may be made while remaining within the spirit and scope of the invention.

We claim:

1. A composition comprising a mixture of about one part by weight of a polyalkylene polyamine of the formula:

$$(R_1)(R_2)NXN(R_1)(R_2)$$

wherein $R_1$ and $R_2$ are selected from the group consisting of hydrogen, (lower)alkyl and $[CH_2CH(Y)O]_mH$, wherein Y is hydrogen or lower alkyl and m is about 1-4; and X is a polyoxy(lower)alkylene moiety or $C_2-C_6$ alkylene; and (b) about 1-3 parts by weight of a glycol compound comprising a (lower)alkylene glycol (lower)alkyl ether, a (lower)alkylene glycol phenyl ether, and mixtures thereof; wherein said mixture is effective as an accelerator when added to alkali metal hydroxidebased paint stripping baths.

2. The composition of claim 1 wherein X further incorporates a $C_3-C_6$ alkylene unit substituted with a unit of the formula $[OCH_2CH(Y)]_nN(R_1)(R_2)$ wherein n is about 1-4.

3. The composition of claim 1 wherein the polyoxy(lower)alkylene group X comprises about 3-60 alkylene units.

4. The composition of claim 3 wherein the polyamine is a compound of the formula:

$$H_2NCH(CH_3)CH_2[OCH(CH_3)CH_2]_a(OCH_2CH_2)_b[OCH_2CH(CH_3)]_cNH_2$$

wherein a+c is about 3-4, and b is about 10 to 50.

5. The concentrate of claim 3 wherein the polyamine is a compound of the formula:

$$H_2NCH(CH_3)CH_2[OCH(CH_3)CH_2]_a(OCH_2CH_2)_b[OCH_2CH(CH_3)]_cNH_2$$

wherein b is 0 and a+c is about 2-35.

6. The composition of claim 1 wherein the glycol compound is propylene glycol monomethyl ether, dipropylene glycol monomethyl ether, tripropylene glycol monomethyl ether or mixtures thereof.

7. The compositon of claim 6 wherein there are about 1-3 parts by weight of the glycol for each part by weight of the polyamine.

8. The composition of claim 1 which further comprises water.

* * * * *

UNITED STATES PATENT AND TRADEMARK OFFICE
CERTIFICATE OF CORRECTION

PATENT NO. : 4,594,176

DATED : June 10, 1986

INVENTOR(S) : Dennis F. Mahoney, et al.

It is certified that error appears in the above-identified patent and that said Letters Patent is hereby corrected as shown below:

```
At Cover page, Column 2, for "Jeffamine Polyoxypropyleneamines"
     read --Jeffamine Polyoxypyleneamines--.
At Column 1, line 45, for "5-50% weight"
     read --5-50% by weight--.
At Column 2, line 10, for "ammonialike" read --ammonia-like--.
At Column 2, line 10, for "like" read --life--.
At Column 2, line 19, for "thermallystable"
     read --thermally-stable--.
At Column 3, line 31, for "C3C6" read --C3-C6--.
At Column 3, line 56, for "diamine" read --diamines--.
At Column 3, line 68, for "phenylethers" read --phenyl-ethers--.
At Column 5, line 22, for "1-15%" read --1-5%--.
At Column 5, line 27, for "di-or" read --di- or--.
At Column 5, line 65, for "concentration" read --concentrate--.
At Column 6, line 16, for "d-230" read --D-230--.
At Column 11, line 64, for "(40.0)" read --(4.0)--.
At Column 12, line 22, after "of" insert --(a)--.
At Column 12, line 37, for "hydroxidebased"
     read --hydroxide-based--.
```

Signed and Sealed this

Twenty-fifth Day of November, 1986

Attest:

DONALD J. QUIGG

Attesting Officer

Commissioner of Patents and Trademarks